United States Patent [19]

Cox et al.

[11] Patent Number: 4,633,962
[45] Date of Patent: Jan. 6, 1987

[54] ARTICULATED WHEEL CHAIR

[76] Inventors: Francis C. Cox, Colonial House-Apt. #3, Rural Rt. 1, Humboldt, Iowa 50548; Darryl R. Cox, 611 Oakwood Dr.-#3, Sparks, Nev. 89431

[21] Appl. No.: 803,220

[22] Filed: Dec. 2, 1985

[51] Int. Cl.$^4$ ............................................. B60K 1/02
[52] U.S. Cl. ................................. 180/65.1; 180/329; 180/907; 280/442
[58] Field of Search ............... 180/65.1, 907, 908, 180/235, 326, 329, 330; 280/400, 442, 91, 103, 99, 771; 296/65 R, 63; 297/349, DIG. 4

[56] References Cited

U.S. PATENT DOCUMENTS 2,765,862 10/1956 Tucker, Jr. ........................ 180/235
3,664,450 5/1972 Udden et al. ..................... 180/65.1

FOREIGN PATENT DOCUMENTS 333770 10/1958 Switzerland ..................... 180/235

Primary Examiner—John J. Love
Assistant Examiner—Eric D. Culbreth
Attorney, Agent, or Firm—Herman H. Bains

[57] ABSTRACT

An articulated wheel chair includes front and rear sections which are pivotally connected together to permit pivoting therebetween about a vertical axis. The front section is provided with a pair of support wheels and the rear section is provided with a pair of propulsion wheels driven by an electric motor. A seat for the occupant is pivotally mounted on the rear section and is connected to the front section by a link to cause pivoting of the seat in response to articulated pivoting movement between the sections.

8 Claims, 6 Drawing Figures

ARTICULATED WHEEL CHAIR

This invention relates to wheel chairs and, more particularly, to articulated wheel chairs.

BACKGROUND OF THE INVENTION

Conventional wheel chairs can be manipulated and guided by occupants in spacious areas, but these wheel chairs are difficult to maneuver in tight quarters. In typically furnished homes and apartments, occupants of conventional wheel chairs have extreme difficulty in maneuvering the wheel chairs around tight turns and into small rooms, such as bathrooms or the like. These problems arise with conventional wheel chairs because of the construction and manner of operation of the conventional wheel chair, regardless of whether such wheel chairs are operator propelled or power driven.

SUMMARY OF THE INVENTION

It is a general object of this invention to provide a novel articulated wheel chair whose dimensions are less than the dimensions of conventional wheel chairs and which is highly maneuverable.

A more specific object of this invention is the provision of an articulated wheel chair in which the wheel chair sections pivotally articulate about a vertical axis, thereby permitting turning about a small radius.

Another object of this invention is to provide a novel articulated wheel chair in which the wheel chair sections articulate relative to each other and in which the seat also pivots relative to the associated wheel chair section in response to articulation between the wheel chair sections. These and other objects of the invention are more fully described in the following Specification.

FIGURES OF THE DRAWINGS

DESCRIPTION OF THE PREFERRED EMBODIMENT

Figure 1:
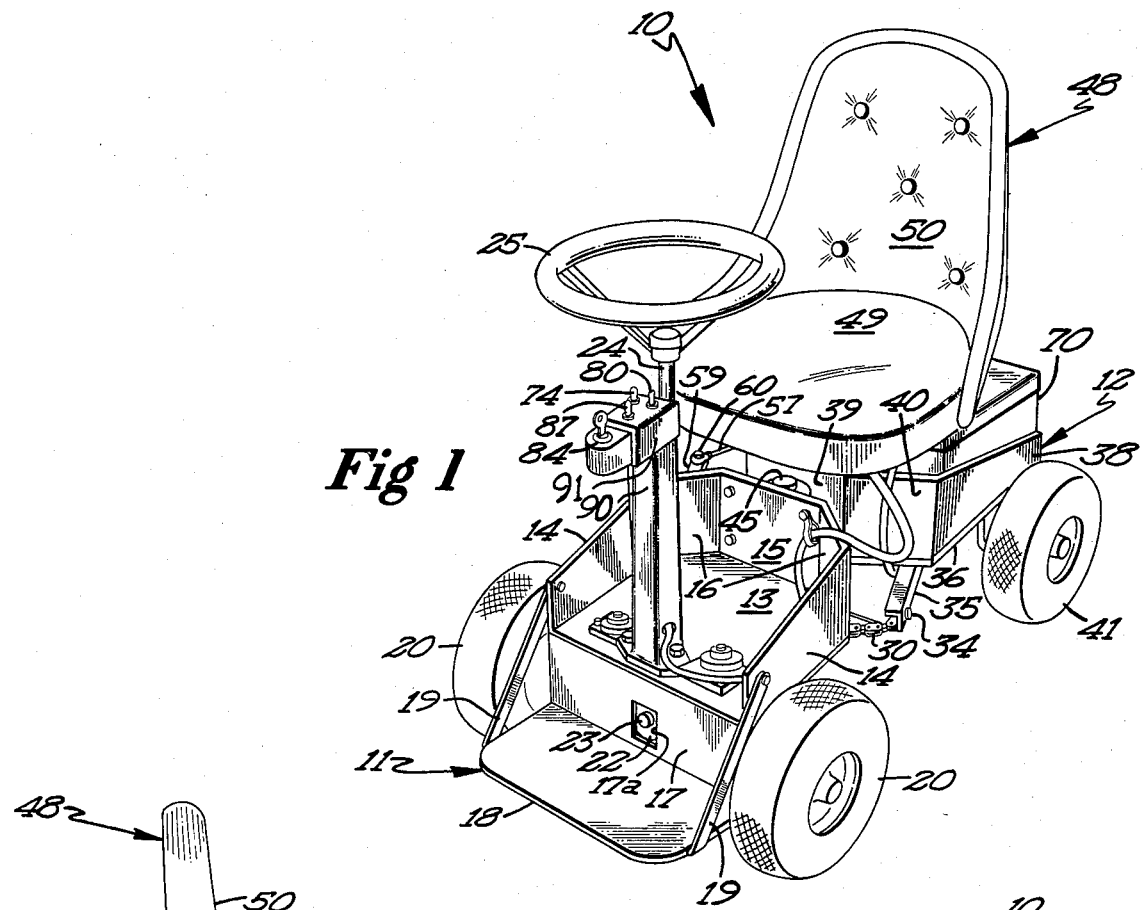
FIG. 1 is a perspective view of the novel articulated wheel chair.
Figure 2:
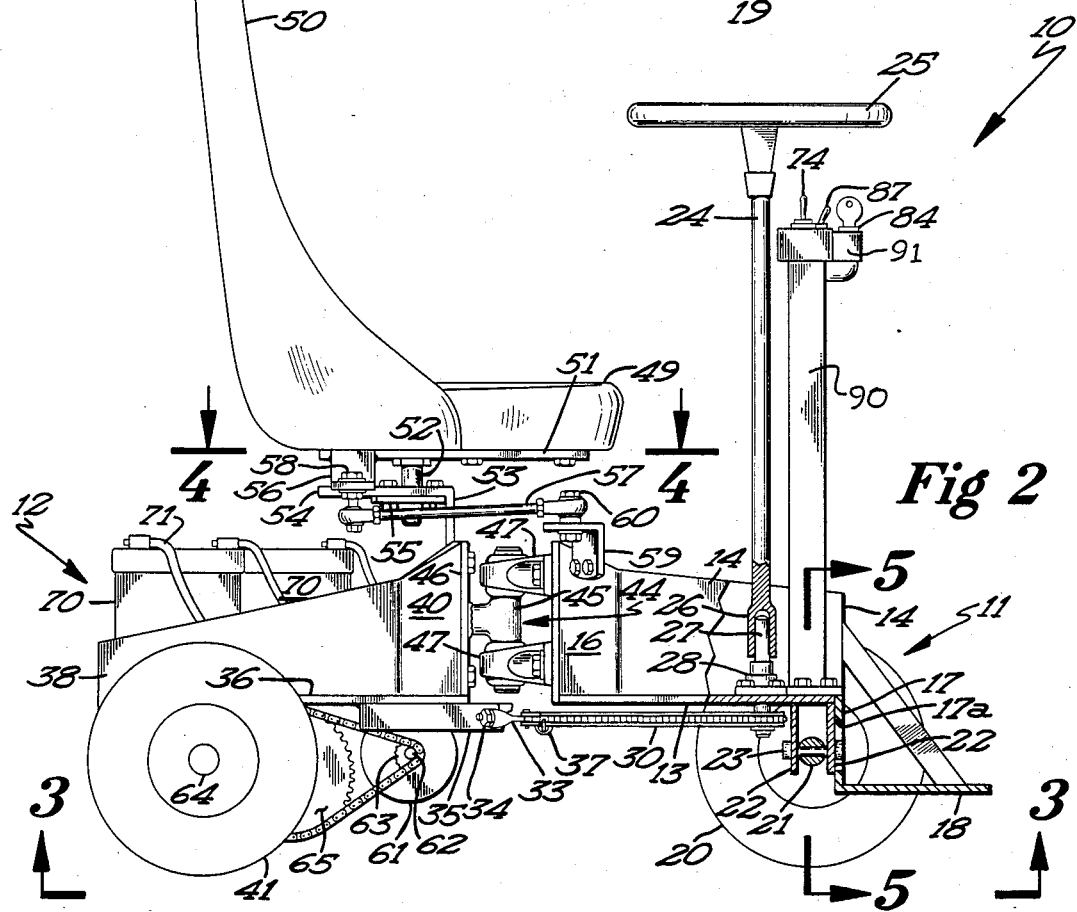
FIG. 2 is a side elevational view thereof, with certain parts thereof broken away for clarity.

Referring now to the drawings, and, more particularly, to FIGS. 1 and 2, it will be seen that one embodiment of the novel articulated wheel chair, designated generally by the reference numeral 10, is thereshown. The articulated wheel chair 10 includes a front section 11 which is interconnected to a rear section 12. In the embodiment shown, the front and rear sections may be formed of a suitable rigid material, such as metal, preferably aluminum, although many other types of rigid material may also be used. It will be seen that the front section includes a floor or lower wall 13 which is disposed in substantially horizontal relation and which is provided with a peripheral wall including vertical side walls 14, a rear wall 15, and oblique walls 16 interconnecting the side walls with the rear wall 15. In the embodiment shown, the side walls 14, rear wall 15, and oblique walls 16 are integral with the lower wall 13.

It will also be noted that the lower wall 13 has a front wall 17 integrally formed therewith and depending therefrom. The front wall 17 has a horizontal foot rest panel 18 integrally formed therewith and projecting forwardly therefrom. Suitable inclined braces 19 extend between the foot rest panel and side walls 14 to rigidify the foot rest. In this regard, it will be noted that the foot rest panel 18 extends at substantially right angles to the depending front wall 17.

The front wheel chair section 11 is provided with a pair of tire-mounted wheels 20 at each side, as best seen in FIGS. 1 and 2. The tires on the tire mounted wheels 20 are inflated and are provided with suitable treads. The wheels 20 are interconnected by a transverse axle 21, which is pivotally connected to a bracket 22 intermediate the ends thereof by a pivot 23. The bracket 22 is rigidly affixed to the lower wall 13 intermediate the side edges thereof, as best seen in FIGS. 1 and 2. The pivot 23 permits rocking of the axle 21 about a longitudinally extending horizontal axis.

Means are provided for steering the articulated wheel chair, and this means includes an elongate substantially straight vertically disposed steering rod 24, which is provided with a steering wheel 25 at its upper end and which has a downwardly opening socket 26 at its lower end. The socket 26 is of rectangular cross-sectional configuration and engages a steering pin 27, which is journaled in a bearing 28 secured to the lower wall 13 by suitable bolts. The steering pin 27, which is a rectangular cross-sectional configuration, projects downwardly beyond the lower surface of the lower wall 13 and has a sprocket 29 secured thereto. An elongate chain 30 is trained about the sprocket 29 and is also trained about a pair of sprockets 31 which are revolvably connected to the lower wall 13 of the front section by sprocket axles 32.

Figure 3:
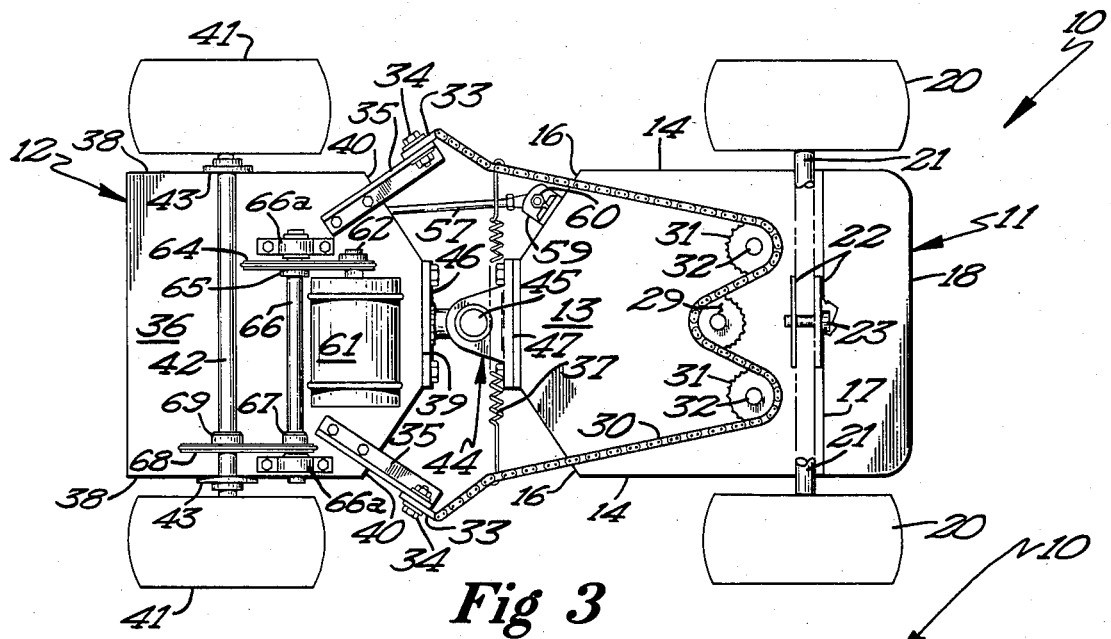
FIG. 3 is a bottom plan view of the wheel chair taken approximately along the cutting line 3—3 and looking in the direction of the arrows.

Each end of the chain 30 is connected to one of a pair of connector elements 33. Each connector element 33 is secured by a nut and bolt assembly 34 to one of a pair of brackets 35 which are secured to the lower surface of the floor or lower wall 36 of the rear section 12. It will be noted that the brackets 35 project outwardly and forwardly from the lower wall 36 and that the connector elements 33 are connected to the forward end portions thereof. Referring now to FIG. 3, it will be noted that an elongate transversely extending spring 37 has its opposite ends connected to the chain 30 and serves to exert a yieldable centering force on the chain during the steering of the articulated wheel chair.

Referring again to FIGS. 1 and 2, it will be seen that the rear section 12 also has a peripheral wall integrally formed with the lower wall 36 thereof and projecting upwardly therefrom. This peripheral wall includes opposed side walls 38, a front wall 39, and oblique walls 40 extending between the side walls and interconnected with the front wall 39. The rear section 12 is also provided with a pair of tire-mounted propulsion wheels 41 which are interconnected to a transverse axle 42, the latter being journaled in wheel brackets 43, depending from the rear section adjacent the rear portion thereof.

The front and rear sections are pivotally interconnected to each other by an articulated pivot assembly 44. In the embodiment shown, a T-shaped pin 45 is welded to a plate 46, which is bolted to the front wall of the rear section 12. The T-shaped pin 45 is oriented so that the cross portion is disposed vertically. The cross portion of the T-shaped pin 45 projects through and is journaled in upper and lower pillow bearings 47. In the embodiment shown, the pillow bearings 47 are bolted to the rear wall of the front section 11. With this arrangement, it will be seen that the front and rear sections are interconnected together to articulate about a vertical axis defined by the T-shaped pin 45.

The rear section 12 is also provided with an occupant seat 48, which includes a seat rest 49 having an upstanding back rest 50 affixed thereto and projecting upwardly therefrom. The seat rest 49 has a plate 51 secured to the lower surface thereof and the plate has a post 52 rigidly affixed thereto and depending thereupon. An L-shaped bracket 53 is rigidly affixed to the front wall of the rear section 12, and the horizontal leg 54 of this bracket has an opening therein through which post 52 projects. Post 52 is journaled in a bearing 55 which is secured to the horizontal leg 54 by suitable bolts or the like. With this arrangement, the seat 48 can pivot about an axis defined by the post 12. In the embodiment shown, it will be seen that the pivotal axis of the seat is located only slightly rearwardly of the articulated pivotal axis between the front and rear sections.

Figure 4:
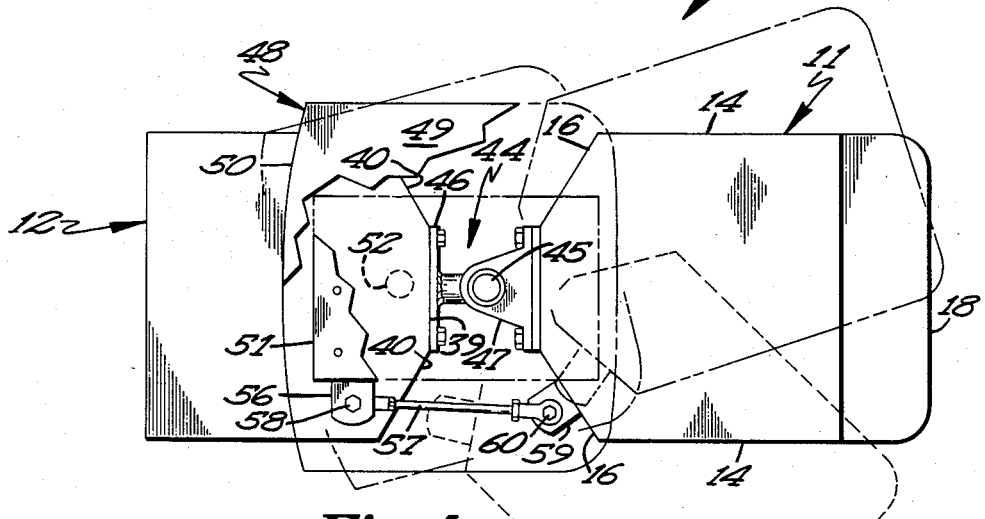
FIG. 4 is a cross-sectional view taken approximately along the line 4—4 of FIG. 2 and looking in the direction of the arrows.
Figure 5:
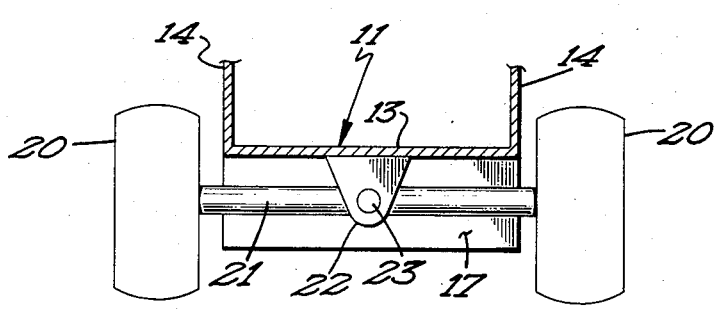
FIG. 5 is a cross-secional view taken approximately along the line 5—5 of FIG. 2 and looking in the direction of the arrows.

Means are provided for causing pivoting movement of the seat 48 in response to articulated pivotal movement between the front and rear sections. This means includes an L-shaped bracket 56 which is affixed to the seat plate 51 and which projects outwardly from one side thereof. One end of an elongate link 57 is pivotally connected to the L-shaped bracket 56 by a pivot 58, as best seen in FIGS. 2 and 4. The other end of the link 57 is pivotally connected to the horizontal leg of an L-shaped bracket 59 by a pivot 60. In the embodiment shown, the L-shaped bracket 59 is rigidly affixed to one of the oblique walls of the front section by suitable bolts or the like. With this arrangement, it will be seen that, when the front and rear sections are pivoted relative to each other, the seat 48 will also be pivoted to maintain the seat in proper comfortable orientation for the occupant.

Power means are provided for propelling the rear propulsion wheels 41 and this power means includes an electric motor 61, which is secured to the lower surface of the lower wall of the rear section 12, as best seen in FIG. 3. The output shaft 62 of the electric motor is provided with a sprocket 63, and a chain 64 is trained about the sprocket 63 and about a sprocket 65, which is affixed to a jackshaft 66. The jackshaft is journaled in suitable bearings 66 secured to the lower surface of the lower wall of the rear section 12. The jackshaft 66 is also provided with a sprocket 67 which has a chain 68 trained thereover. The chain 68 is also trained about a sprocket 69 which is affixed to the axle 42 for the rear propulsion wheels. It will, therefore, be seen that, when the electric motor 61 is energized, the rear wheels will be driven. It is pointed out that the electric motor 61 is reversible, thereby permitting the drive of the propulsion wheels in forward and reverse direction.

Figure 6:
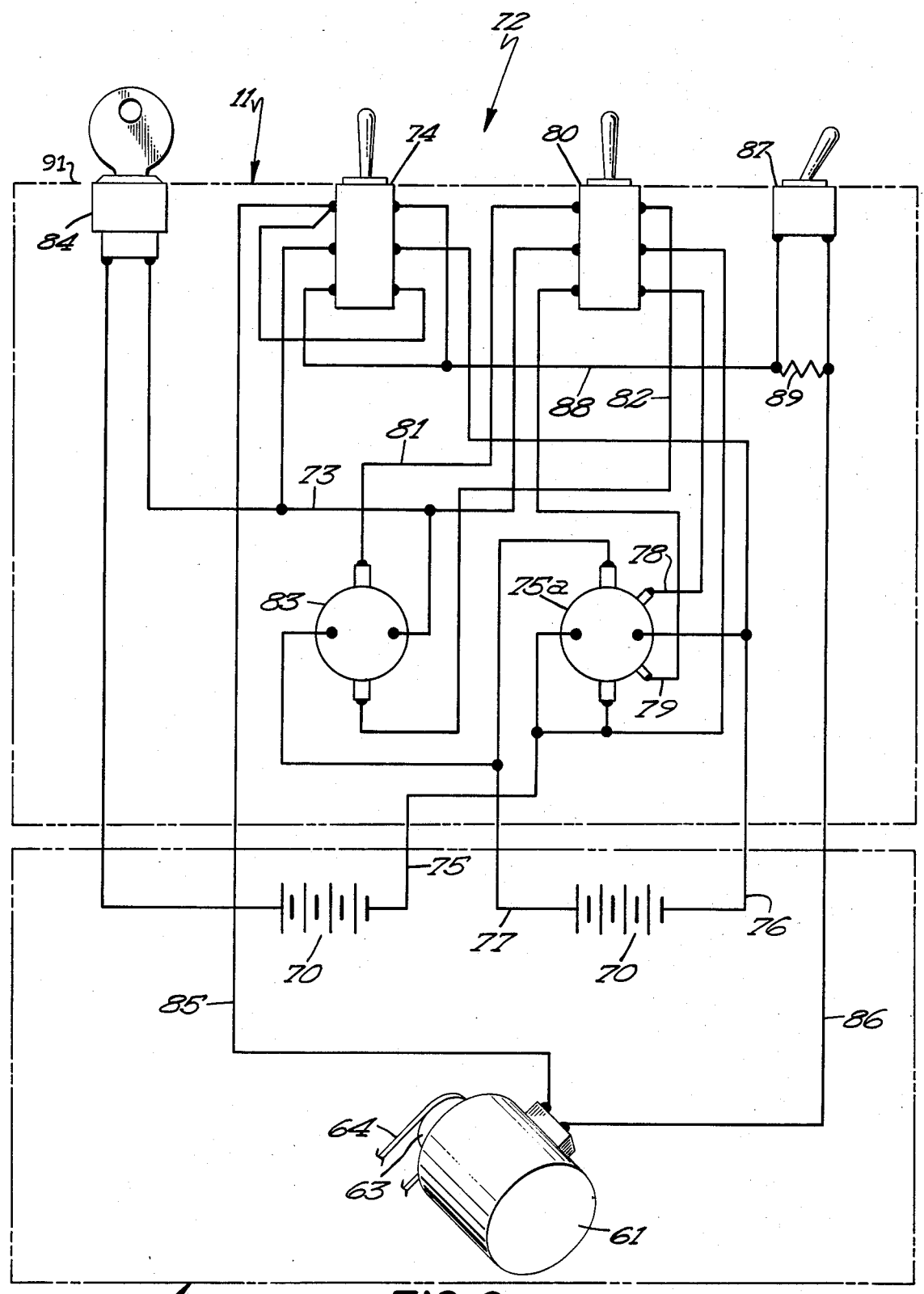
FIG. 6 is an electrical schematic illustrating the circuitry employed with the novel articulated wheel chair.

Electrical energy for the electric motor 61 is provided by a pair of 12-volt 3/AH gel-type batteries 70 which are supported by the lower wall for the rear section 12. Referring now to FIG. 6, an electrical schematic diagram, designated generally by the reference numeral 72, for operating the articulated wheel chair is thereshown. It will be seen that the positive terminal of one of the batteries 70 is connected by a conductor 73 to one contact of a three-position forward and reverse switch 74. The negative terminal of this same battery 70 is connected by a conductor to one terminal of a magnetic switch 75a.

The negative terminal of the other battery 70 is connected by a conductor 76 to one of the contacts of the forward and reverse switch 74. The positive terminal of this last mentioned battery is connected by a conductor 77 to one of the terminals of the magnetic switch 75a. One of the contacts of the magnetic switch 75a is connected by a conductor 78 to one of the contacts of a series and parallel mode switch 80. Another contact of the magnetic switch 75a is connected by an electrical conductor to another contact of the series and parallel mode switch 80.

The series and parallel mode switch 80 is a double-throw two-position switch, and one of the contacts thereof is connected by a conductor 81 to one terminal of a magnetic switch 83. Another contact of the series and parallel mode switch 80 is connected by a conductor 82 to another terminal of the magnetic switch 83. It will be seen that a master on/off switch 84 is disposed in circuit controlling relation in the conductor 73. The on/off switch 84 is mechanically operated with a conventional key.

It will be seen that one contact of the forward and reverse switch 74 is connected to one contact of the electric motor 61 by an electrical conductor 85. The other contact of the electric motor is connected by an electrical conductor 86 to one contact of a resistor cut-out switch 87. The other contact for the switch 87 is connected by an electrical conductor to one of the terminals of the forward and reverse switch 74. The resistor 89 is connected in parallel to the primary circuit for the electric motor 61. In the embodiment shown, a post 90 is mounted on the lower wall of the front section 11 and projects upwardly therefrom just forwardly of the steering rod 24. The upper end portion of the post 90 has a control box 91, and the control box contains the switches 74, 80, 84, and 87. It will be noted that the control box is located at a position for convenient access by an occupant sitting on the seat 48.

In operation, the series and parallel mode switch 80 will be actuated to electrically inter-relate the battery 70 in either a series or parallel mode. Ordinarily, the switch will be actuated to place the battery circuits in parallel with each other, and this closes normally open switch 83 and opens magnetic switch 75a so that only one of the batteries 70 will be in use. The forward and reverse switch 74 will be in the neutral position, and switch 87 will be shifted so that the current for the motor circuit 61 does not pass through the resistor 89. The master switch 84 will be closed, and the operator will then shift the forward and reverse switch to either a forward or reverse position. The electric motor will be energized to drive the articulated wheel chair, and the operator steers the wheel chair by rotating the steering wheel for the steering rod 24. It will be seen that rotation of the steering rod produces articulated movement between the front and rear sections allowing the wheel chair to perform wide or tight turns, depending on the degree of rotation of the steering rod. When the articulated sections are pivoted relative to each other, the link 57 will be shifted in response to this articulated pivoting movement and thereby cause pivoting movement of the seat 48. This arrangement permits the operator to be conveniently oriented during these turning maneuvers. The switch 87 may be actuated to phase the resistor 89 into the motor circuit and thereby reduce the speed of the wheel chair. This arrangement provides a simple speed control device for use by the operator when desired.

It is pointed out that the overall length dimension of the articulated wheel chair is less than the length dimension of a conventional wheel chair, and the lateral dimensions are also less than the lateral dimensions of a conventional wheel chair.

This articulated wheel chair permits maneuvering by an operator in crowded quarters in either reverse or forward directions in a manner not heretofore possible with conventional wheel chairs.

Thus, it will be seen that we have provided a novel articulated wheel chair, which is not only of simple and inexpensive construction, but one which functions in a more efficient and desirable manner than any heretofore known comparable wheel chair.

What is claimed is:

1. An articulated wheel chair comprising:
   a front section having a pair of support wheels journaled thereon for support thereof,
   a rear section having a pair of propulsion wheels connected thereto for support thereof,
   means pivotally connecting said front and rear sections together for pivotal movement therebetween about an articulating vertical axis,
   power means on said rear section drivably connected to said propulsion wheels for driving the latter,
   a seat pivotally mounted on said rear section for pivotal movement relative thereto,
   a generally vertically disposed elongate steering rod on said front section and being rotatable about its longitudinal axis, means interconnecting said steering rod with said rear section to produce articulated pivotal movement between the sections in response to rotation of said steering rod,
   and motion transmitting means interconnecting said front section with said seat for causing pivoting of the seat in response to articulated pivoting movement between the sections.

2. The articulated wheel chair as defined in claim 1 and a foot rest secured to said front section adjacent the front end thereof.

3. The articulated wheel chair as defined in claim 1 wherein said power means comprises a reversible electric motor and circuit means controlling operation of said electric motor including a forward and reverse switch for selectively reversing operation of said electric motor.

4. The articlulated wheel chair as defined in claim 3 wherein said circuit means includes a speed control circuit and switch means interposed in said speed control circuit for selectively controlling the same.

5. The articulated wheel chair as defined in claim 1 wherein said means interconnecting said steering rod with said rear section includes a flexible member.

6. The articulated wheel chair as defined in claim 5 wherein said flexible member includes an elongate chain and a sprocket interconnected with said steering rod and being engaged by said chain.

7. The articulated wheel chair as defined in claim 5 and a resilient member connected with said flexible member and being operable to urge the front and rear sections into aligned relation.

8. The articulated wheel chair as defined in claim 1 wherein said motion transmitting means comprises an elongate link having one end thereof pivotally connected to said seat and having the other end thereof pivotally connected to said front section.

* * * * *